(12) United States Patent
Miller et al.

(10) Patent No.: US 7,222,223 B2
(45) Date of Patent: May 22, 2007

(54) MANAGEMENT OF I/O OPERATIONS IN DATA STORAGE SYSTEMS

(75) Inventors: Wayne Eugene Miller, Livermore, CA (US); Yuri Vladimirovich Bagashev, Cupertino, CA (US); David Alan Burton, Vail, AZ (US); Noel Simen Otterness, Lafayette, CO (US); Paul Michael Remley, Livermore, CA (US)

(73) Assignee: Pillar Data Systems, Inc., San Jose, CA (US)

( * ) Notice: Subject to any disclaimer, the term of this patent is extended or adjusted under 35 U.S.C. 154(b) by 432 days.

(21) Appl. No.: 10/976,430

(22) Filed: Oct. 29, 2004

(65) Prior Publication Data

US 2006/0095686 A1 May 4, 2006

(51) Int. Cl.
*G06F 13/00* (2006.01)
(52) U.S. Cl. .......................... 711/158; 711/4; 711/111; 711/112; 711/114; 711/151; 710/40; 710/244
(58) Field of Classification Search ................. 711/158, 711/4, 111, 112, 114, 151; 710/40, 244
See application file for complete search history.

(56) References Cited

U.S. PATENT DOCUMENTS

| | | | | |
|---|---|---|---|---|
| 5,511,177 | A * | 4/1996 | Kagimasa et al. .......... | 711/114 |
| 5,701,465 | A | 12/1997 | Baugher et al. | |
| 5,745,778 | A | 4/1998 | Alfieri | |
| 5,831,985 | A | 11/1998 | Sandorfi | |
| 6,073,218 | A * | 6/2000 | DeKoning et al. .......... | 711/150 |
| 6,157,963 | A | 12/2000 | Courtright, II et al. | |
| 6,212,562 | B1 | 4/2001 | Huang | |
| 6,298,386 | B1 | 10/2001 | Vahalia et al. | |
| 6,418,468 | B1 | 7/2002 | Ahlstrom et al. | |
| 6,457,098 | B1 * | 9/2002 | DeKoning et al. .......... | 711/114 |
| 6,633,835 | B1 | 10/2003 | Moran et al. | |
| 6,651,125 | B2 * | 11/2003 | Maergner et al. .......... | 710/244 |
| 6,701,393 | B1 | 3/2004 | Kemeny et al. | |
| 6,779,078 | B2 | 8/2004 | Murotani et al. | |
| 6,912,635 | B2 * | 6/2005 | Patterson et al. .......... | 711/165 |
| 6,986,137 | B1 * | 1/2006 | King et al. .................. | 718/104 |
| 7,007,276 | B1 * | 2/2006 | Kubala et al. .............. | 718/104 |
| 7,051,188 | B1 * | 5/2006 | Kubala et al. ................ | 712/29 |
| 2002/0056025 | A1 | 5/2002 | Qiu et al. | |
| 2002/0091722 | A1 * | 7/2002 | Gupta et al. ................. | 707/204 |
| 2002/0174227 | A1 | 11/2002 | Hartsell et al. | |

(Continued)

*Primary Examiner*—Stephen C. Elmore
(74) *Attorney, Agent, or Firm*—Robert Moll (57) ABSTRACT

The invention relates to management of I/O in data storage systems. In an embodiment, the invention provides a data storage subsystem processing I/O requests each having a priority, comprising a processor, a memory coupled to the processor, a disk array, an array controller coupled to the processor and the disk array, a network interface, coupled to the processor, to receive an I/O request with a priority, and a program in the memory for managing the I/O request based on the priority, a clip level of the priority, the total workload in the data storage subsystem, and processing I/O requests based on priority, workload clip levels, and fairness levels. The invention also contemplates the use of static and dynamic adjusted clip levels. The invention also relates to a method of managing I/O requests, comprising receiving an I/O request, determining the priority of the I/O request, comparing the total workload to the clip level for the priority, and processing the I/O request if the total workload is below the clip level or the priority workload is below a fairness level.

27 Claims, 8 Drawing Sheets

U.S. PATENT DOCUMENTS

| | | |
|---|---|---|
| 2003/0061362 A1 | 3/2003 | Qiu et al. |
| 2003/0097443 A1 | 5/2003 | Gillett et al. |
| 2004/0030766 A1 | 2/2004 | Witkowski |
| 2004/0049564 A1 | 3/2004 | Ng et al. |

\* cited by examiner

FIGURE 1

| Priority Of I/O Request | Workload | Clip Level | Fairness Level |
|---|---|---|---|
| High | High Priority | 500 | 200 |
| Medium | Medium Priority | 250 | 100 |
| Low | Low Priority | 75 | 15 |

Total Workload = High Priority + Medium Priority + Low Priority

| Priority Of I/O Request | Workload | Clip Level | Fairness Level |
|---|---|---|---|
| High | Upper Range: 375 - 500<br>Lower Range: 0 - 374 | 700 Adjusted<br>500 Default | 200 |
| Medium | Upper Range: 150 - 250<br>Lower Range: 0 - 149 | 400 Adjusted<br>250 Default | 100 |
| Low | Low Priority | 160 Adjusted<br>75 Default | 15 |

Total Workload = High Priority + Medium Priority + Low Priority

Batching Of I/O Requests
And Resending Of Rejected I/O Requests

| Priority Of I/O Request | Batch Size (# of I/O Requests) | Maximum Dwell Time (Milliseconds) | Minimum Backoff Time To Resend (Milliseconds) |
|---|---|---|---|
| High | 15 | 5 | 2 |
| Medium | 25 | 10 | 5 |
| Low | 35 | 20 | 9 |

MANAGEMENT OF I/O OPERATIONS IN DATA STORAGE SYSTEMS

BACKGROUND

The present invention relates to managing I/O operations in data storage systems.

This application incorporates herein by reference as follows:

U.S. application Ser. No. 10/264,603, Systems and Methods of Multiple Access Paths to Single Ported Storage Devices, filed on Oct. 3, 2002;

U.S. application Ser. No. 10/354,797, Methods and Systems of Host Caching, filed on Jan. 29, 2003, now U.S. Pat. No. 6,965,979;

U.S. application Ser. No. 10/397,610, Methods and Systems for Management of System Metadata, filed on Mar. 26, 2003;

U.S. application Ser. No. 10/440,347, Methods and Systems of Cache Memory Management and Snapshot Operations, filed on May 16, 2003, now U.S. Pat. No. 7,124,243;

U.S. application Ser. No. 10/600,417, Systems and Methods of Data Migration in Snapshot Operations, filed on Jun. 19, 2003, now U.S. Pat. No. 7,136,974;

U.S. application Ser. No. 10/616,128, Snapshots of File Systems in Data Storage Systems, filed on Jul. 8, 2003, now U.S. Pat. No. 6,959,313;

U.S. application Ser. No. 10/677,560, Systems and Methods of Multiple Access Paths to Single Ported Storage Devices, filed on Oct. 1, 2003;

U.S. application Ser. No. 10/696,327, Data Replication in Data Storage Systems, filed on Oct. 28, 2003, now U.S. Pat. No. 7,143,122; and U.S. application Ser. No. 10/837,322, Guided Configuration of Data Storage Systems, filed on Apr. 30, 2004.

In data storage systems, the hosts will make I/O requests (i.e., reads and writes) of the data storage subsystems. Each user of the data storage system may need a different priority of service for the I/O request. The system administrator typically assigns the priority of service based on the type of work and/or the identity of the user.

For efficiency each host can accumulate a batch of I/O requests from users and transmit them to the data storage subsystem. If a host receives ten I/O requests, it will be desirable to process more high priority requests than low priority requests.

One problem is how to ensure that there is fairness between multiple hosts accessing a data storage subsystem. For example, if one host has all high priority requests and a second host has all low priority requests, each request will receive equal priority at a given data storage subsystem. We would like a host transmitting high priority I/O requests to be given more of the data storage subsystem's capacity than a host transmitting low priority I/O requests.

However, all the host I/O requests that arrive at the data storage subsystem for processing get intermixed without regard to priority. Since each host may have its own file system and logical unit number (LUN) of a storage area network (SAN), yet share the same data storage subsystem, there may be a contention problem.

For example, the data storage system should ensure a host with a higher quality of service (QoS) file system is not given lower priority than another host with a lower QoS file system and retain the ability to configure file systems and SAN LUNs by different QoS. At the same time, the data storage system should ensure that all I/O requests are completed in a reasonable time.

In an attempt to solve this problem, the hosts could communicate between each other on a regular basis to exchange information about pending I/O requests, but communications need to be frequent to manage the I/O requests and maintain a sense of priority. In addition, this will not scale well as additional hosts will add significant processing overhead.

It would be desirable if a solution existed that did not require such communication between the hosts since overhead would not increase as hosts increased. It would be also desirable if the solution ensured high priority I/O requests were guaranteed a certain amount of I/O resources, while still not starving out lower priority I/O requests. It would be helpful if the number of priority levels could be easily modified to allow for different priorities (e.g., two or more) to allow for better tuning of the system. The maximum number of I/O requests allowed per priority level could be then determined through testing and some qualitative analysis of different workloads.

SUMMARY OF THE INVENTION

The invention relates to management of I/O operations in data storage systems. In an embodiment, the invention provides a data storage subsystem processing I/O requests each having a priority, comprising a processor, a memory coupled to the processor, a disk array, an array controller coupled to the processor and the disk array, a network interface, coupled to the processor, to receive an I/O request with a priority, and a program in the memory for managing the I/O request based on the priority, a clip level of the priority, the total workload in the data storage subsystem, and comparing the clip level to the total workload.

In another embodiment, the invention determines if the total workload is greater than the clip level or even if the total workload is above the clip level if the priority workload is below the fairness level and accepts the I/O request for processing such as incrementing the total workload and the priority workload, such as a read or a write to the disk array, either according to a write-back or a write-through scheme. Thus, the invention processes I/O requests based on priority, workload, clip levels, and fairness levels.

The invention also contemplates use of static and dynamic adjusted clip levels. In the case of dynamic clip levels, each priority of workload includes ranges such that if a priority of workload is in a lower range, the clip levels of the other priorities adjust to fully utilize I/O resources.

The invention also relates to a method of managing I/O requests, comprising receiving an I/O request, determining priority of the I/O request, comparing the total workload to the clip level for the priority, and processing the I/O request if the total workload is below the clip level or the priority workload is below a fairness level.

DETAILED DESCRIPTION OF THE PREFERRED EMBODIMENTS

The following description includes the best mode of carrying out the invention, illustrates the principles of the invention, uses illustrative values, and should not be taken in a limiting sense. The scope of the invention is determined by reference to the claims. Each part or step is assigned its own number in the specification and drawings.

Figure 1:
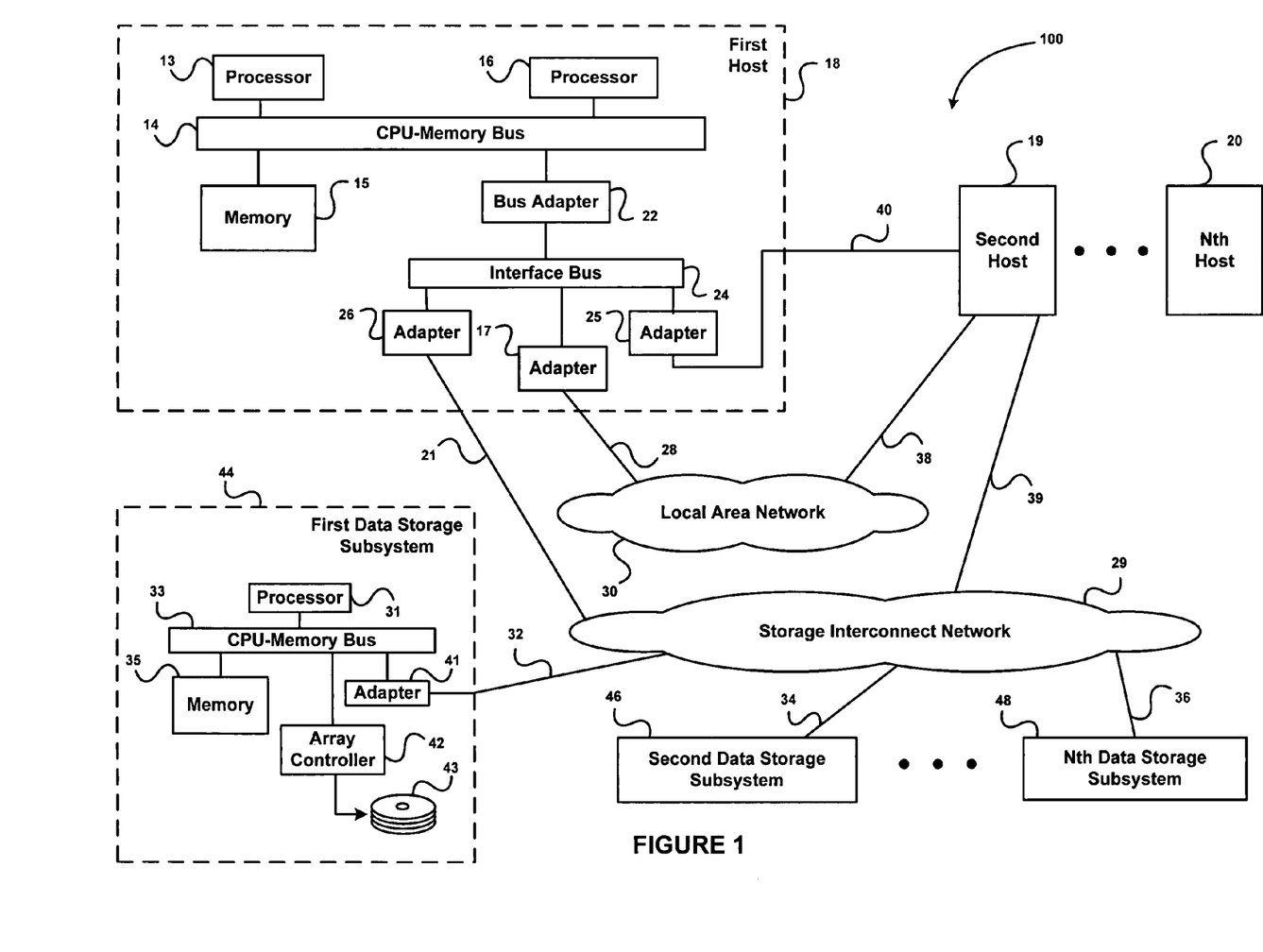
FIG. 1 illustrates a data storage system and provides details of a first host and of a first data storage subsystem.

FIG. 1 illustrates a data storage system 100 that includes first through Nth hosts 18, 19 and 20, and first through Nth data storage subsystems 44, 46 and 48. Each host is a computer that can connect to clients, data storage subsystems and other hosts using software/hardware interfaces such as network interface cards and software drivers to implement Ethernet, Fibre Channel, ATM, SCSI, InfiniBand, etc. Hennessy and Patterson, *Computer Architecture: A Quantitative Approach* (2003), and Patterson and Hennessy, *Computer Organization and Design: The Hardware/Software Interface* (2004) describe computer hardware and software, storage systems, memory, caching and networks and are incorporated herein by reference.

Each host runs an operating system such as Linux, UNIX, a Microsoft OS, or another suitable operating system. Tanenbaum, *Modern Operating Systems* (2001) describes operating systems in detail and is incorporated herein by reference.

FIG. 1 shows the first host 18 includes a CPU-memory bus 14 that communicates with the processors 13 and 16 and a memory 15. The processors 13 and 16 used are not essential to the invention and could be any suitable general-purpose processor such as an Intel Pentium processor, an ASIC dedicated to perform the operations described herein, or a field programmable gate array (FPGA).

Each host includes a bus adapter 22 between the CPU-memory bus 14 and an interface bus 24, which in turn interfaces with network adapters 17, 25 and 26.

The first host 18 communicates through the network adapter 25 over a link 40 with a second host 19. The first host 18 can also communicate through the network adapter 17 over link 28 with the local area network (LAN) 30. The first host 18 also communicates through the network adapter 26 over a link 21 with a storage interconnect network 29. Similarly, the second host 19 communicates over links 38 and 39 with the LAN 30 and the storage interconnect network 29, respectively. The storage interconnect network 29 also communicates over links 32, 34, and 36 with the data storage subsystems 44, 46, and 48, respectively.

In sum, the hosts 18, 19 and 20 communicate with each other, the LAN 30 and storage interconnect network 29 and data storage subsystems 44, 46, and 48.

The LAN 30 and the storage interconnect network 29 can be separate networks as illustrated or combined in a single network, and may be any suitable known bus, SAN, LAN, or WAN technology such as Fibre Channel, SCSI, InfiniBand, or Ethernet, and the type of interconnect is not essential to the invention. See Kembel, *The FibreChannel Consultant, A Comprehensive Introduction* (1998), Kembel, The FibreChannel Consultant, *Arbitrated Loop* (1996–1997) The FibreChannel Consultant, *Fibre Channel Switched Fabric* (2001), Clark, *Designing Storage Area Networks* (2003), Clark, *IP SANs: A Guide to iSCSI, iFCP, and FCIP Protocols for Storage Area Networks* (2002) and Clark, *Designing Storage Area Networks* (1999), which are incorporated herein by reference.

FIG. 1 shows the first data storage subsystem 44 includes a CPU-memory bus 33 that communicates with the processor 31 and a memory 35. The processor 31 used is not essential to the invention and could be any suitable general-purpose processor such as an Intel Pentium processor, an ASIC dedicated to perform the operations described herein, or a field programmable gate array (FPGA). The CPU-memory bus 33 also communicates through an adapter 41 and link 32 with the storage interconnect network 29 and an array controller 42, such as a RAID controller, interfacing with an array of storage devices (e.g., a disk array 43).

U.S. application Ser. No. 10/677,560, Systems and Methods of Multiple Access Paths to Single Ported Storage Devices, filed on Oct. 1, 2003 describes suitable data storage subsystems, each containing a disk array, and is incorporated by reference herein. In an alternative embodiment, any other suitable array of storage devices can replace the disk arrays (e.g. an array of tape drives or an array of nonvolatile semiconductor memory). Massiglia, *The RAID Book: A Storage System Technology Handbook* (6th Edition, 1997) describing RAID technology is incorporated herein by reference.

A host may access secondary storage devices (e.g., disk drives) through a VLUN (virtual logical unit) that abstracts the storage device(s) as a linear array of fixed-size blocks. A logical block address (LBA) identifies each fixed-sized block. The data storage system constructs a VLUN from all or parts of several physical storage devices such as disk drives. To make a large VLUN, a data storage system may concatenate space allocated from several storage devices. To improve performance, the data storage system maps adjacent regions of VLUN space onto different physical storage devices (striping). To improve reliability, the system holds multiple copies of a VLUN on different storage devices (mirroring).

Users request write and read operations of the data storage system 100. A system administrator can assign a low, medium, or high priority level for each type of work (e.g., backup, document production, and transaction processing). The priority can be set in an I/O request such as a SCSI command that provides a command descriptor block (CDB). For example, a three-bit field in the CDB can set up to eight levels of command priority. The width of the bit field determines the possible levels of priority.

In operation, a user requests an I/O operation of one of the hosts 18, 19, or 20 which will transmit the request on the LAN 30 or the storage interconnect network 29 to one of the data storage subsystems 44, 46, or 48.

If a write is received, the data storage subsystem 44 can use a write-through scheme and not acknowledge the write until the data is written to nonvolatile memory (e.g., disk array 43). This ensures data consistency between the host and data storage subsystem in the event of a power failure, etc.

In a write-back scheme, the data storage subsystem 44 can acknowledge the write before data is written to a disk array 43 as long as the data is stored in another form of nonvolatile memory (e.g., battery backed RAM) until written to the disk array to again ensure data consistency.

Figure 2:
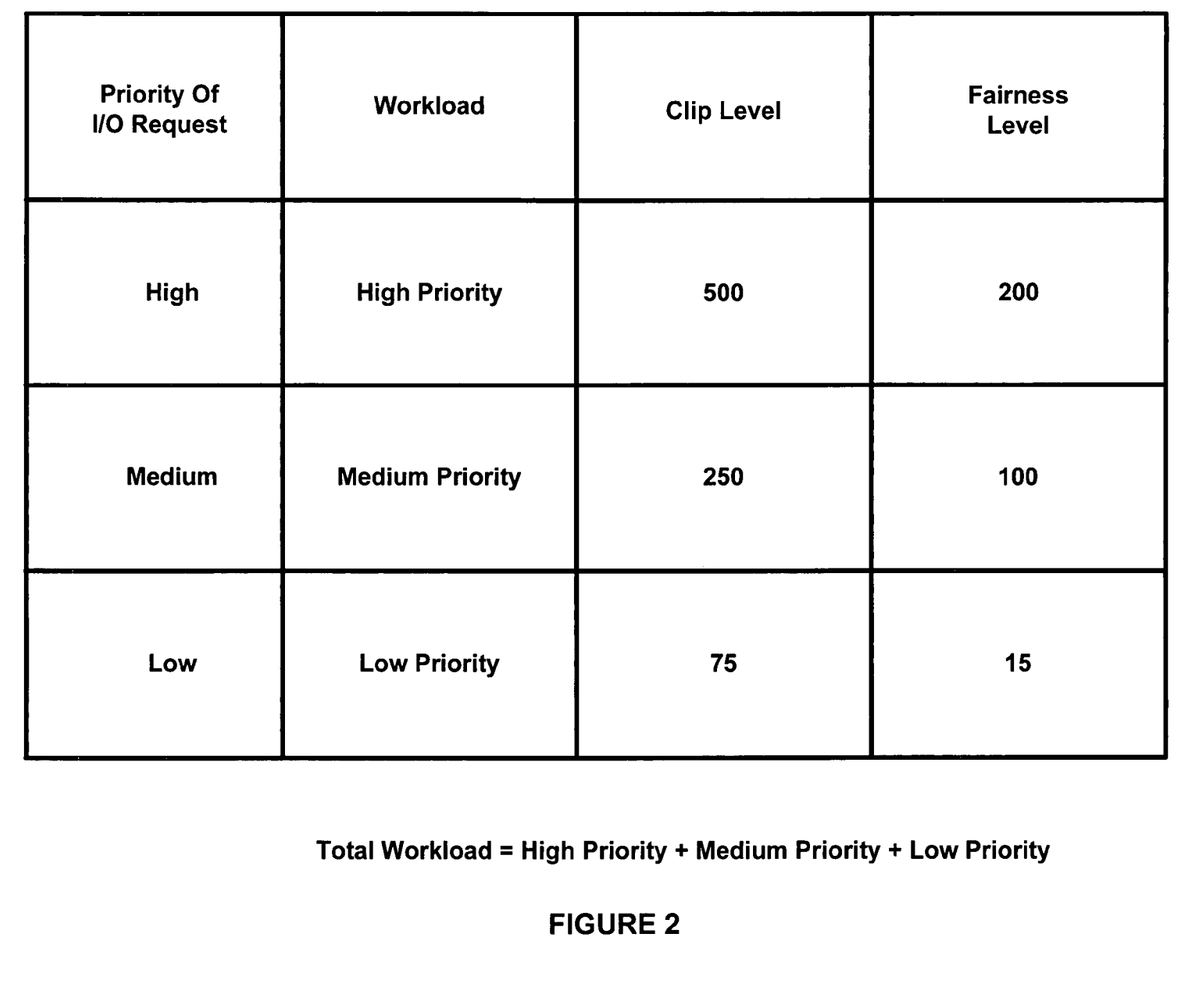
FIG. 2 represents a data structure in memory of a data storage subsystem to manage I/O requests according to clip levels, and fairness levels.

FIG. 2 illustrates a memory of each data storage subsystem that contains values in a data structure (e.g., a table) for the I/O requests, the workload according to priorities (e.g., high, medium, and low), and the total workload clip level and the fairness level for each priority. In FIGS. 2, 4, 5, 7, and 8, the values are for illustration purposes only; the actual values are determined on a system by system basis.

The total workload is a number representing the sum of the high, medium, and low priority I/O requests accepted for processing in the data storage subsystem. If an I/O request is accepted for processing, the data storage subsystem increments the total workload by one. After the I/O request is processed, e.g., the write or read is completed, the data storage subsystem decrements the total workload by one and acknowledges completion to the host.

Each I/O request has a priority that relates to a clip level and a fairness level that is used to determine if the I/O request will be accepted for processing by the data storage subsystem. The fairness levels ensure sufficient I/O resources so each I/O request is processed within a reasonable time.

When an I/O request arrives at the data storage subsystem, the data storage subsystem will process the I/O request in one of the following ways: (1) the data storage subsystem will reject the I/O request with a busy status to the host if the total workload is above the maximum that the data storage subsystem can process; (2) the data storage subsystem will reject the I/O request with an insufficient priority status to the host if the priority of the request is insufficient; and (3) the data storage subsystem will accept the I/O request for processing if it is not too busy and the priority is sufficient. After processing is complete, the data storage subsystem will transmit completion status to the host.

Figure 3:
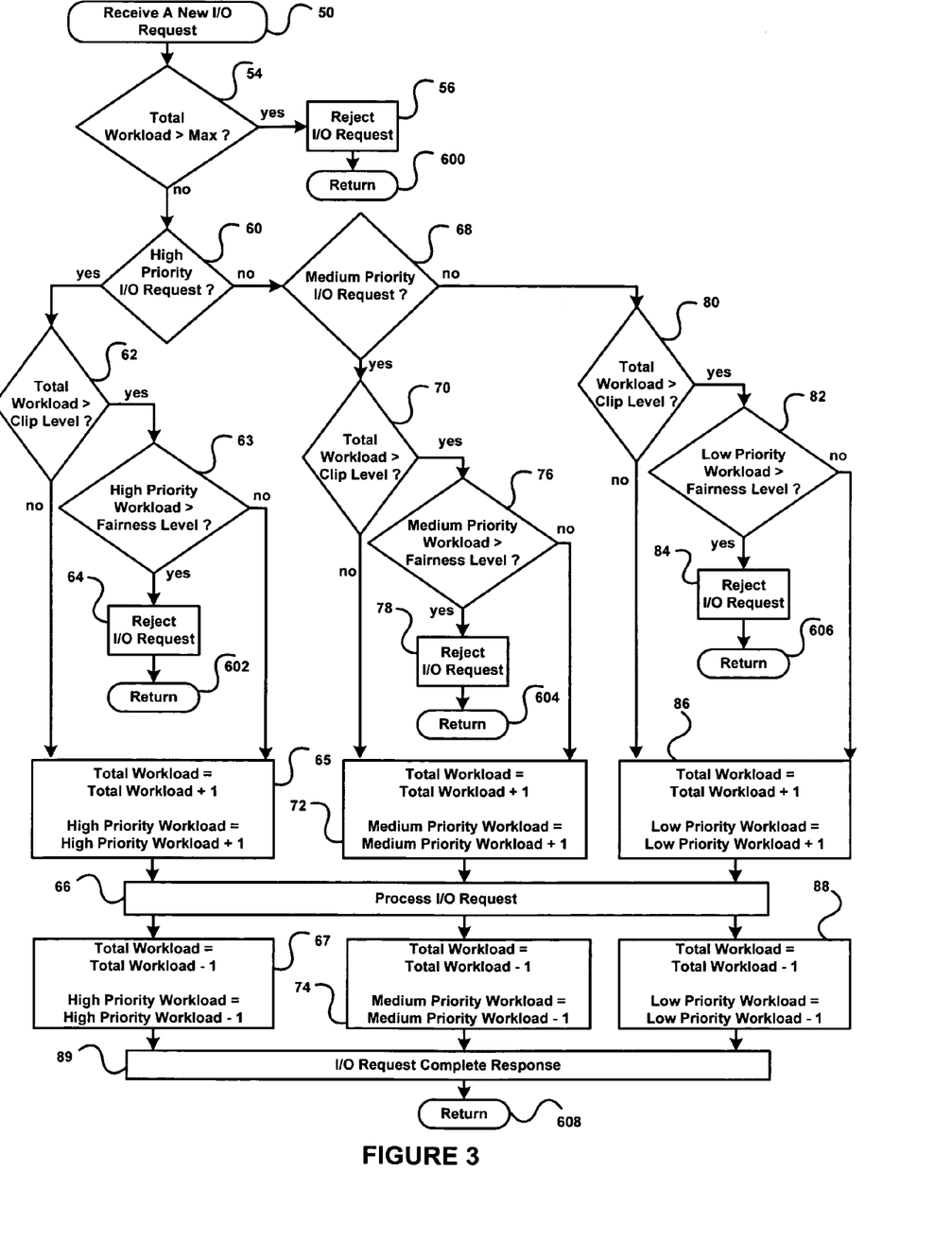
FIG. 3 illustrates a flow chart of a method implemented in a data storage subsystem to handle I/O requests using clip levels and fairness levels.

FIGS. 2–3 illustrate a method in the data storage subsystem for management of I/O requests. Preferably, the method is implemented in a higher level language, e.g., the C programming language, which instructs the the data storage subsystem.

Referring to FIG. 3, the method starts at step 50 when the data storage subsystem receives an I/O request, for example, from a host. At step 54, the data storage subsystem determines if the total workload exceeds a max value. The max value represents the maximum number I/O requests the data storage subsystem can process. If the total workload exceeds the max, the data storage subsystem rejects the I/O request at step 56 and at step 600 returns to the main program, and if not, the data storage subsystem proceeds to step 60. At step 60, the data storage subsystem determines the priority of the I/O request (e.g., high).

Let's first assume the data storage subsystem determines the I/O request is high priority at step 60. At step 62, the data storage subsystem will determine if the total workload is greater than a high priority clip level. In FIG. 2, the high priority clip level=500. If the total workload does not exceed the high priority clip level, the data storage subsystem will process the I/O request as follows:

1) At step 65, the data storage subsystem increments by one the total workload and the high priority workload, that is, the high priority I/O requests and the total of I/O request that will be processed in the data storage subsystem;

2) At step 66, the data storage subsystem processes the I/O request either by a read or a write using a write-through or write-back scheme;

3) At step 67, the data storage subsystem decrements by one the high priority workload and the total workload, since the I/O request was processed at step 66; and 4) At step 89, the data storage subsystem acknowledges the I/O request was processed, that is, it sends a I/O request complete response to the host. Finally, the method returns to the main program at step 608.

Returning to step 62, even if the total workload is greater than the clip level, the data storage subsystem will process a certain number of high priority I/O requests as a matter of fairness. Thus, at step 63 the data storage subsystem will process a high priority I/O request if the number of high priority workload falls below the fairness level. Otherwise, a burst of medium and low priority I/O requests could prevent high priority I/O requests from getting timely processed by the data storage subsystem.

FIGS. 2–3 illustrate the data storage subsystem will process a high priority I/O request even if the total workload is greater than the clip level (e.g., 500 total I/O requests) as long as a certain number (e.g., 200) of high priority I/O requests is not being processed. Thus, the data storage subsystem will again execute steps 65, 66, 67, and 89 as described earlier. Conversely, if the fairness level is met, the high priority I/O request will be rejected at step 64. Finally, the method returns to the main program at step 602. In short, the fairness level ensures high priority I/O requests are handled to give excellent response time.

Let's now assume the data storage subsystem determined the I/O request was medium priority at step 68:

At step 70, the data storage subsystem will determine if the total workload is greater than a clip level (e.g., 250) associated with the medium priority I/O requests.

If the total workload does not exceed the medium priority clip level, the data storage subsystem will process the medium priority I/O request as follows:

1) At step 72, the data storage subsystem increments by one the total workload and the medium priority workload in the data storage subsystem;

2) At step 66, the data storage subsystem processes the I/O request either by a read or a write using a write-through or write-back scheme;

3) At step 74, the data storage subsystem decrements by one the total workload and the medium priority workload in the data storage subsystem, since the I/O request is no longer using data storage subsystem capacity; and 4) At step 89, the data storage subsystem sends a I/O request complete response to the host. Finally, the method returns to the main program at step 608.

Returning to step 70, even if the total workload is greater than the clip level, the data storage subsystem processes a certain number of medium priority I/O requests as a matter of fairness. Thus, if the data storage subsystem determines that it is not processing a minimum number (e.g., 100) of medium priority I/O requests set by the fairness level at step 76, the data storage subsystem will process the medium priority I/O request by executing steps 72, 66, 74, and 89. Conversely, if the clip level is exceeded and the fairness level met, the medium priority I/O request will be rejected at step 78 and the method returns to the main program at step 604.

Now let's assume, the data storage subsystem determined that the I/O request is low priority at step 80:

At step 80, the data storage subsystem determines if the total workload is greater than a clip level (e.g., 75) associated with the low priority I/O requests.

If the total workload does not exceed the low priority clip level, the data storage subsystem will process the low priority I/O request as follows:

1) At step 86, the data storage subsystem increments by one the number of total workload and low priority workload in the data storage subsystem;

2) At step 66, the data storage subsystem processes the I/O request either by a read or a write using a write-through or write-back scheme;

3) At step 88, the data storage subsystem decrements by one the total workload and low priority workload in the data storage subsystem, since the I/O request is no longer using data storage subsystem capacity; and 4) At step 89, the data storage subsystem sends a I/O request complete response to the host. Finally, the method returns to the main program at step 608.

Returning to step 80, even if the total workload is greater than the clip level, the data storage subsystem processes some low priority I/O requests as a matter of fairness. The data storage subsystem processes a low priority I/O request by executing steps 86, 66, 88, and 89 if the data storage subsystem is not processing a minimum number (e.g., 15) of low priority I/O requests set by the fairness level as determined at step 82. Conversely, if the clip level is exceeded and the fairness level met, the low priority I/O request will be rejected at step 84. Finally, the method returns to the main program at step 606.

Thus, each priority has a fairness level that determines if an I/O request of a given priority will be accepted by the data storage subsystem. This ensures the data storage subsystem reserves a minimum amount of resources for each priority of I/O request.

Figure 4:
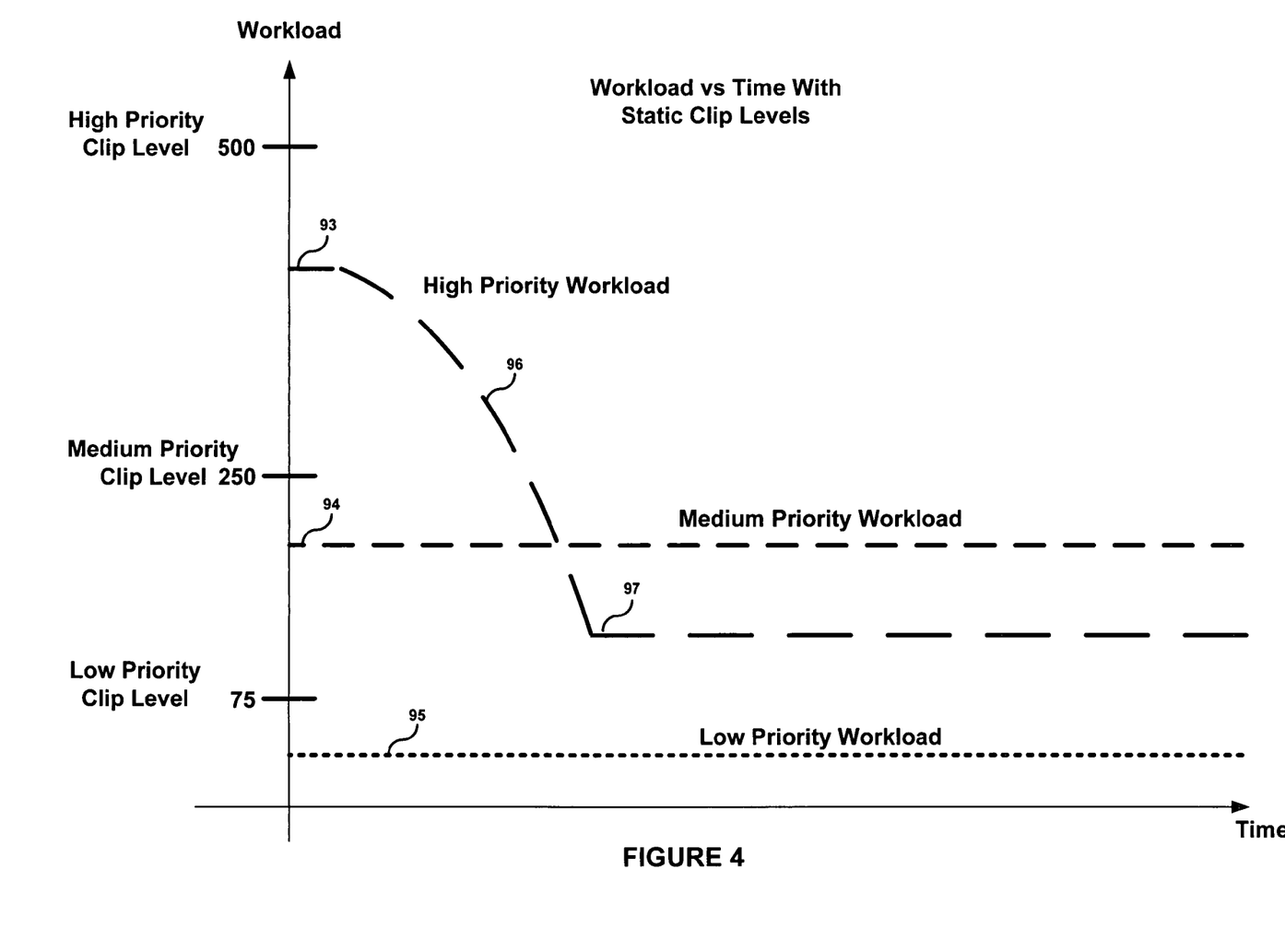
FIG. 4 is a diagram representing high, medium, and low priority workloads with respect to time, and high, medium, and low priority static clip levels.

FIG. 4 is a diagram of each priority of workload with respect to time when the data storage subsystem has static clip levels. The data storage subsystem has a high priority clip level of 500, medium priority clip level of 250, and low priority clip level of 75. Initially, the data storage subsystem processes the high, medium, and low priority clip levels below their respective clip levels. As time proceeds, the high priority I/O requests drops from level 93 along the curve 96 to level 97. In the meantime, the medium priority and low priority workloads remain constant at levels 94 and 95 that is below the illustrative medium and low priority clip levels of 250 and 75.

Figure 5:
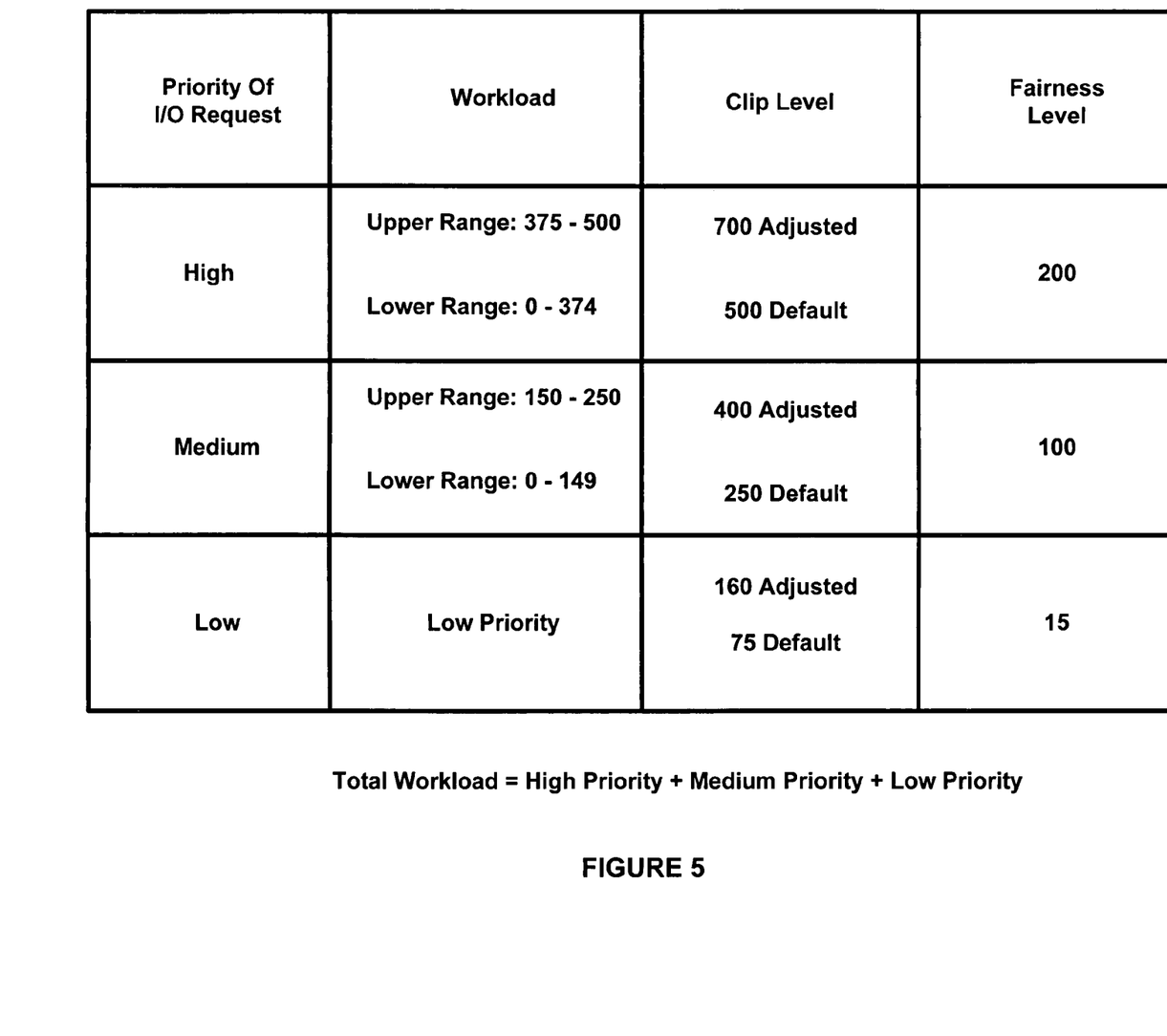
FIG. 5 illustrates a data structure in memory of a data storage subsystem to manage I/O requests according to dynamic clip levels and fairness levels.

FIG. 5 illustrates another embodiment of values held in a data structure in the memory of each data storage subsystem to manage I/O requests according to dynamic clip levels. Each I/O request has a high, medium, or low priority.

FIG. 5 depicts an upper range (e.g., 375–500) and a lower range (e.g., 0–374) for high priority workload. The data storage subsystem use the ranges to dynamically adjust the clip levels. For example, if the data storage subsystem has a high priority workload in the upper range (e.g., 375–500), the high, medium, and low priority clip levels stay at their default values. In contrast, if the data storage subsystem has a high priority workload in the lower range (e.g., 0–374) the data storage subsystem increases the medium priority clip level upward from a default value (e.g., 250) to an adjusted clip level (e.g., 400), and/or the low priority clip level upward from a default value (e.g., 75) to an adjusted clip level (e.g., 160). This dynamic clip adjustment ensures that the data storage subsystem is more fully utilized for processing medium priority and low priority I/O requests, when the high priority workload falls into lower range.

The data structure shows an upper range (e.g., 150–250) and a lower range (e.g., 0–149) for medium priority workload. The data storage subsystem will use these ranges to dynamically adjust the high priority clip level and/or the low priority clip level. For example, if the data storage subsystem has a medium priority workload in the upper range (e.g., 150–250), the high, medium, and low priority clip levels stay at their default values. In contrast, if the data storage subsystem has a medium priority workload in the lower range (e.g., 0–149) the data storage subsystem increases the high priority clip level from the default value (e.g., 500) to an adjusted clip level (e.g., 700) and/or the low priority clip level from the default value (e.g., 75) to an adjusted clip level (e.g., 160). This dynamic clip adjustment again ensures the data storage subsystem is better used for processing high and low priority I/O requests, when the medium priority workload falls into the lower range.

Figure 6:
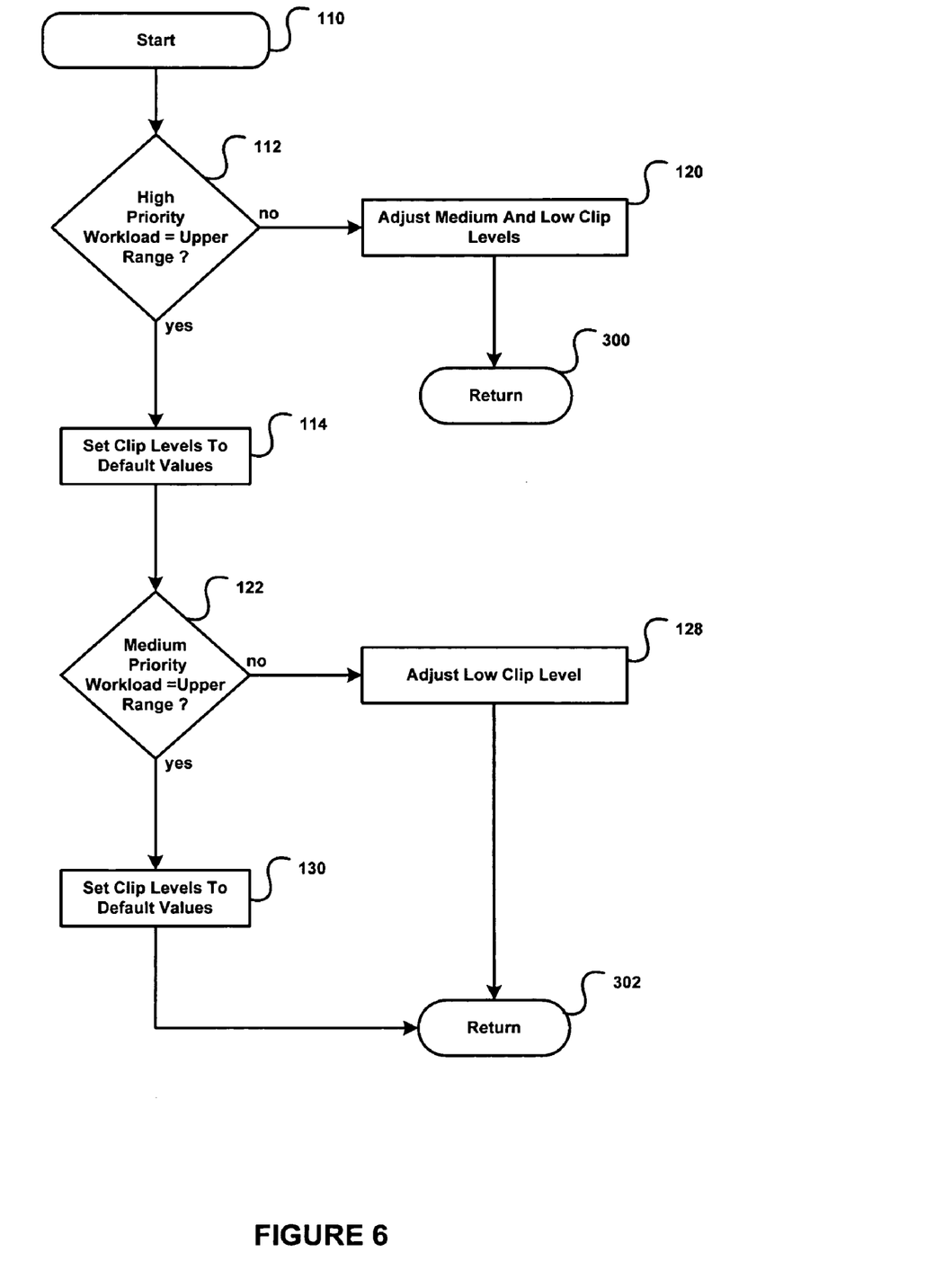
FIG. 6 illustrates a flow chart of a method implemented in a data storage subsystem to handle I/O requests using dynamic clip levels.

FIG. 6 illustrates a method that instructs a data storage subsystem to process I/O requests using dynamic clip levels for three priorities with two ranges per priority.

The method starts at step 110. At step 112, the data storage subsystem determines if the high priority workload is in the upper range (e.g., 375–500). If in the upper range, the data storage subsystem sets (or maintains) the high, medium, and low priority clip levels (e.g., 500, 250, and 75) to their default values at step 114. If the data storage subsystem determines the high priority workload is in the lower range (e.g., 0–374), the data storage subsystem increases the medium and low priority clip levels from their default values (e.g., 250 and 75) to adjusted clip levels (e.g., 400 and 160) at step 120. At step 300, the method returns to the main program.

At step 122, the data storage subsystem determines if medium priority workload is in an upper range (e.g., 150–250). If in the upper range, the data storage subsystem sets (or maintains) the high, medium, and low priority clip levels at their default values (e.g., 500, 250, and 75) at step 130 and then returns to the main program at step 302. If the data storage subsystem determines the medium priority workload is in the lower range (e.g., 0–149), the data storage subsystem increases the low priority clip level from its default value (e.g., 75) to its adjusted clip level (e.g., 160) at step 128. At step 302, the method returns to the main program.

In alternative embodiments, the method of FIG. 6 can be implemented with two or more priorities with two or more ranges per priority. If higher priority workload is in a lower range, the data storage subsystem increases a clip level associated with lower priority workload to best use the capacity of data storage subsystem.

Figure 7:
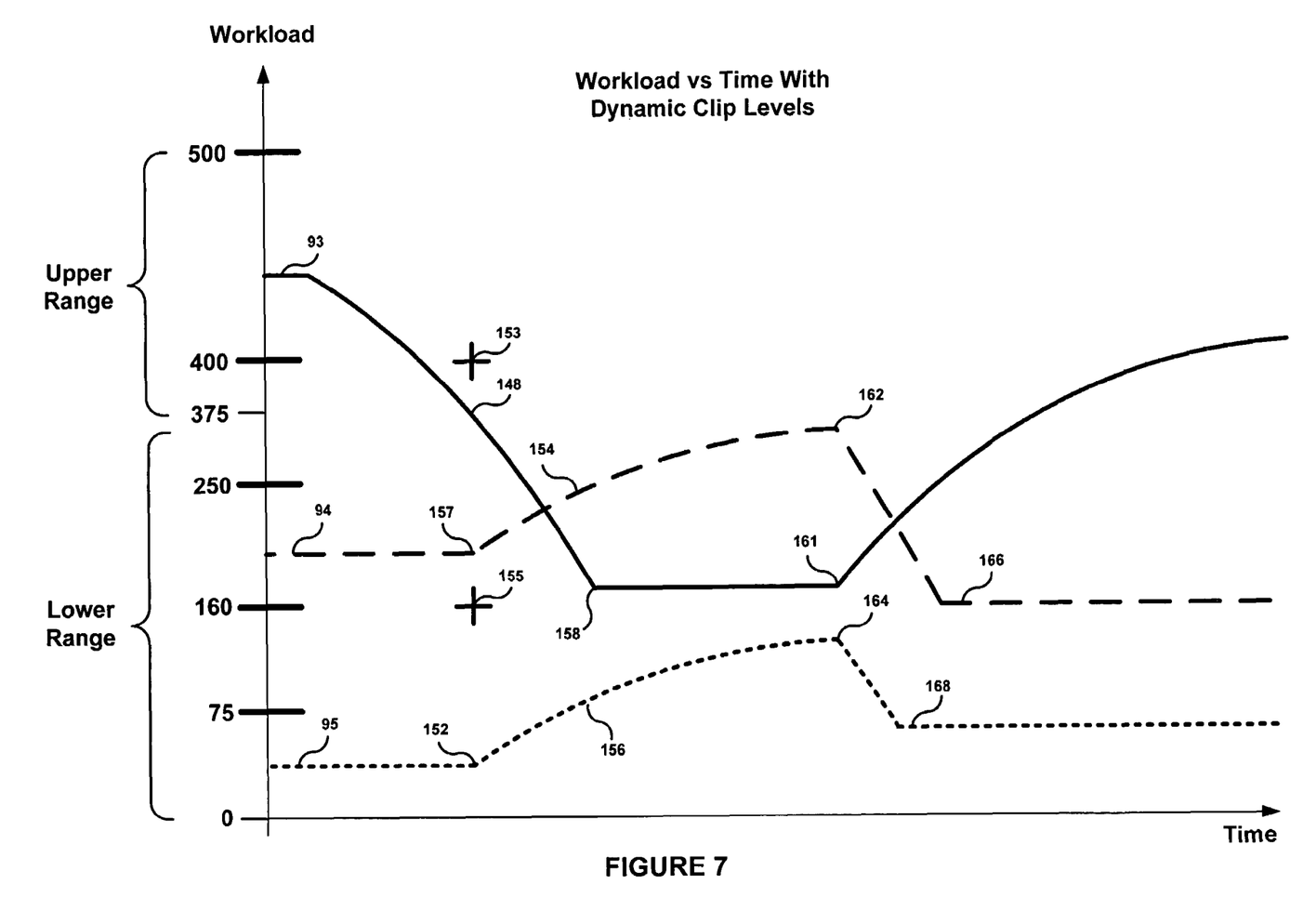
FIG. 7 is a diagram that relates the low, medium, and high priority workloads with respect to time and dynamic clip levels.

FIG. 7 is a diagram that relates the workload of each priority with respect to time for dynamic clip levels. The data storage subsystem initially processes high, medium, and low priority I/O requests at levels 93, 94, and 95. This is not actual experimental results but represents the workload for the data storage subsystem and high, medium, and low priority default values of the clip levels (e.g., 500, 250, and 75). The high priority workload drops along the curve 148, then flattens at point 158 then rises at point 161. As the high priority workload falls from the upper range (e.g., 375–500) the data storage subsystem increases the medium and low priority clip levels from their default values 250 and 75 to adjusted clip levels 153 and 155 (e.g., 400 and 160). As a result of the increased medium priority clip level, the medium priority workload begins to rise at point 157, following curve 154 to point 162. Similarly, the low priority workload begins to rise at point 152, following curve 156 to point 164. However, when the high priority workload begins to rise again at point 161, the medium priority and low priority clip levels go back to their default values (e.g., 250 and 75), and the medium priority workload falls from point 162 to 166, and the low priority workload from point 164 to 168.

Figure 8:
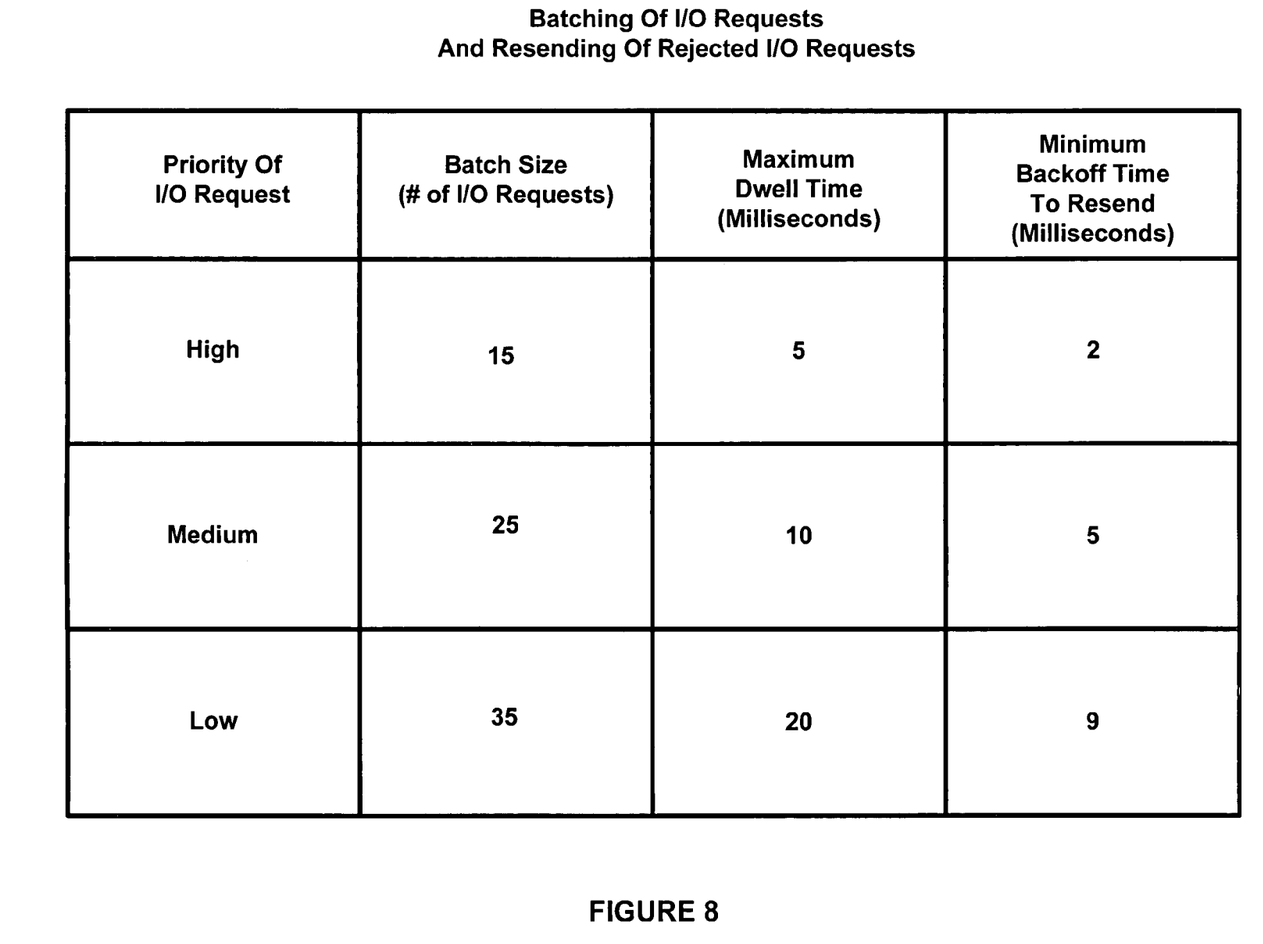
FIG. 8 illustrates how a host handles I/O requests from users and I/O requests rejected by a data storage subsystem.

FIG. 8 illustrates values held in memory of each host to handle I/O requests from users and rejected I/O requests from the data storage subsystem. The table enables batching of I/O requests and resending of I/O requests rejected by the data storage subsystem. Each priority of I/O request has its own values for batch size (i.e., number of I/O requests), maximum dwell time (milliseconds), and minimum backoff time to resend (milliseconds). The host transmits the I/O requests to the data storage subsystem when the I/O requests in the host meet the batch size. The host sorts the batch of I/O requests to reduce the seek time on the disk array. However, if the I/O requests count does not reach the batch size by a maximum dwell time, the host will transmit I/O requests to the data storage subsystem to avoid delay. The host will also wait for a minimum backoff time before resending a previously rejected I/O request to the data storage subsystem to reduce the likelihood of another rejection.

What is claimed is:

1. A data storage subsystem processing I/O requests each having a priority, comprising:
    a processor;
    a memory coupled to the processor;
    a storage device;
    a controller coupled to the processor and the storage device;
    a network interface, coupled to the processor, to receive an I/O request with a priority; and
    a program in the memory for managing the I/O request based on the priority of the I/O request, a clip level for the priority, the total workload in the data storage subsystem, and a comparison of the clip level to the total workload.

2. The data storage subsystem of claim 1, wherein if the total workload is not greater than the clip level, the I/O request is accepted for processing.

3. The data storage subsystem of claim 2, wherein the processing includes incrementing by one the total workload and the priority workload.

4. The data storage subsystem of claim 2, wherein the processing includes a read or a write to the storage device.

5. The data storage subsystem of claim 4, wherein the write to the storage device is according to a write-back scheme.

6. The data storage subsystem of claim 4, wherein the write to the storage device is according to a write-through scheme.

7. The data storage subsystem of claim 1, wherein the clip level is static.

8. The data storage subsystem of claim 1, wherein the clip level is dynamically adjusted.

9. The data storage subsystem of claim 1, further comprising managing the I/O request based on a fairness level of the priority.

10. The data storage subsystem of claim 3, wherein the I/O request is accepted for processing even if the total workload is above the clip level if the priority workload is below the fairness level.

11. The data storage subsystem of claim 1, 2, 3, 4, 5, 6, 7, 8, 9, or 10, wherein the storage device is a disk array and the controller is an array controller.

12. A data storage subsystem, comprising:
    a processor;
    a memory coupled to the processor;
    a disk array;
    an array controller coupled to the processor and the disk array;
    a network interface coupled to the processor to receive a high, medium, and low priority I/O request; and
    a program in memory for managing the high, medium, and low priority I/O requests by comparing the total workload to a high, medium, and low priority clip level, respectively.

13. The data storage subsystem of claim 12, wherein if the total workload is not greater than the high, medium, or low priority clip levels, the data storage subsystem accepts for processing the high, medium, or low priority I/O request, respectively.

14. The data storage subsystem of claim 12, wherein if the high, medium, or low priority workloads are below high, medium, or low fairness levels, the data storage subsystem accepts for processing the high, medium, or low priority I/O requests whether or not the total workload is greater than the high, medium, or low clip levels.

15. The data storage subsystem of claim 14, wherein if the data storage subsystem increments by one the total workload and the high, medium, or low priority workloads when the subsystem accepts for processing the high, medium, or low priority I/O requests.

16. The data storage subsystem of claim 15, wherein the data storage subsystem decrements by one the total workload, and the high, medium, or low priority workloads after processing the high, medium, or low priority I/O request.

17. The data storage subsystem of claim 15, wherein the high priority workload has an upper range and a lower range, wherein if the high priority workload is in the lower range, the data storage subsystem increases the medium and low priority clip levels from default values to adjusted clip levels.

18. A data storage subsystem, comprising:
    a processor;
    a memory coupled to the processor;
    a disk array;
    an array controller coupled to the processor and the disk array;
    a network interface coupled to the processor to receive a plurality of I/O requests from hosts, wherein each I/O request has a priority; and
    wherein the memory contains a total workload, a clip level, and a fairness level for each priority of request, wherein the data storage subsystem manages each priority of I/O request according to the total workload, the clip level and the fairness level.

19. The data storage subsystem of claim 18, wherein if an I/O request is accepted in the data storage subsystem, the data storage subsystem increments by one the total workload, wherein after the I/O request is completed, the data storage subsystem decrements by one the total workload.

20. The data storage subsystem of claim 18, wherein the data storage subsystem manages each I/O request by determining the priority of the I/O request, and comparing the total workload to the clip level and the priority workload to the fairness level of the priority.

21. The data storage subsystem of claim 18, wherein the data storage subsystem accepts an I/O request for processing if the total workload is not greater than the clip level or the priority workload is below the fairness level.

22. The data storage subsystem of claim 18, wherein the total workload includes a high priority workload and a low priority workload, wherein the high priority workload has an upper range and a lower range, wherein if the high priority workload is in the lower range, the data storage subsystem increases the low priority clip level from its default value to its adjusted clip level.

23. A method of managing I/O requests in a data storage subsystem, comprising:
   receiving an I/O request;
   determining priority of the I/O request;
   comparing the total workload in data storage subsystem to a clip level for the priority; and
   processing the I/O request if the total workload in the data storage subsystem is below the clip level.

24. A method of managing I/O requests in a data storage subsystem, comprising:
   receiving an I/O request;
   determining the priority of the I/O request;
   determining if the total workload is not greater than a clip level for the priority;
   if the total workload is not greater than the priority clip level, processing the I/O request as follows:
      incrementing by one the number of the priority workload and the total workload;
      processing the I/O request by accessing a storage device;
      decrementing by one the number of the priority workload and the total workload, since the data storage subsystem has completed processing the I/O request; and
      acknowledging the I/O request is completed by sending a complete response.

25. The method of claim 24, wherein even if the total workload is greater than the clip level, processing the I/O request based on a fairness level corresponding to the priority of the I/O request.

26. A method of managing I/O requests in a data storage subsystem, comprising:
   receiving high and low priority I/O requests;
   providing high and low priority default values and adjusted high and low clip levels;
   determining the high and low priority workload;
   determining that the high priority workload is a lower range; and
   increasing the low priority clip level from its default value to its adjusted clip level so the data storage subsystem can process more low priority I/O requests.

27. The method of claim 26, further comprising determining that the high priority workload rises from the lower range to the upper range, and decreasing the low priority clip level from its adjusted clip level to its default value.

* * * * *